(12) United States Patent
Yoon et al.

(10) Patent No.: US 9,236,997 B2
(45) Date of Patent: Jan. 12, 2016

(54) WIRELESS TRANSCEIVER WITH CIRCULATOR-BASED QUADRATURE DUPLEXER AND METHODS FOR USE THEREWITH

(71) Applicant: BROADCOM CORPORATION, Irvine, CA (US)

(72) Inventors: Seunghwan Yoon, Irvine, CA (US); Ahmadreza Rofougaran, Newport Coast, CA (US); Alireza Tarighat Mehrabani, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 212 days.

(21) Appl. No.: 14/105,478

(22) Filed: Dec. 13, 2013

(65) Prior Publication Data

US 2015/0085710 A1   Mar. 26, 2015

Related U.S. Application Data

(60) Provisional application No. 61/881,271, filed on Sep. 23, 2013, provisional application No. 61/909,816, filed on Nov. 27, 2013.

(51) Int. Cl.
*H04B 7/00* (2006.01)
*H04L 5/14* (2006.01)
*H04L 27/34* (2006.01)

(52) U.S. Cl.
CPC .............. *H04L 5/1461* (2013.01); *H04L 27/34* (2013.01)

(58) Field of Classification Search
None
See application file for complete search history.

(56) References Cited

U.S. PATENT DOCUMENTS

| | | | | |
|---|---|---|---|---|
| 6,262,637 B1 * | 7/2001 | Bradley | ................. | H03H 9/706 310/322 |
| 6,704,349 B1 * | 3/2004 | Masenten | ............. | H04B 1/123 375/219 |
| 7,702,295 B1 * | 4/2010 | Nicholls | ................ | H04B 15/00 455/194.2 |
| 7,916,671 B1 * | 3/2011 | Zortea | ................... | H04L 27/362 370/286 |
| 2002/0109563 A1 * | 8/2002 | Bradley | ................ | H03H 9/605 333/187 |
| 2002/0153965 A1 * | 10/2002 | Ruby | ...................... | H03H 3/04 333/133 |
| 2003/0011446 A1 * | 1/2003 | Bradley | ................ | H03H 9/706 333/187 |
| 2003/0098631 A1 * | 5/2003 | Ruby | ...................... | H03H 3/04 310/312 |
| 2008/0175307 A1 * | 7/2008 | Brunn | .................. | H04B 1/1036 375/148 |

* cited by examiner

*Primary Examiner* — Bob Phunkulh
(74) *Attorney, Agent, or Firm* — Garlick & Markison; Bruce E. Stuckman

(57) ABSTRACT

A wireless transceiver includes a transmit path configured to generate a radio frequency (RF) transmit signal for transmission via an antenna. A receive path is configured to receive an RF receive signal via the antenna. A circulator-based quadrature duplexer includes an in-phase circulator and a quadrature-phase circulator configured to couple the transmit signal from the transmit path to the antenna while generating a residual transmit signal on the receive path, and to couple the receive signal from the antenna to the receive path. The circulator-based quadrature duplexer promotes cancellation of the residual transmit signal on the receive path.

20 Claims, 6 Drawing Sheets

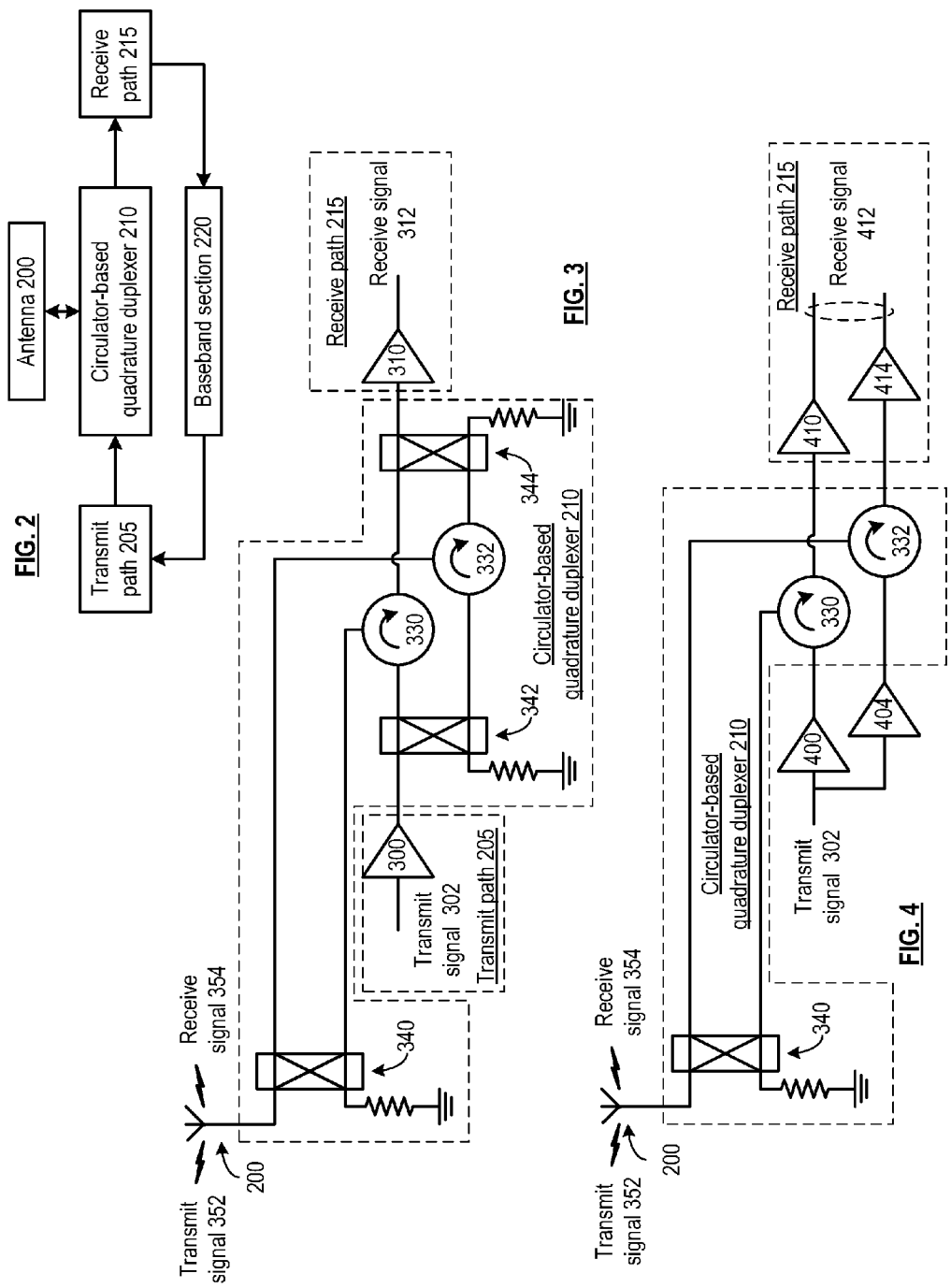

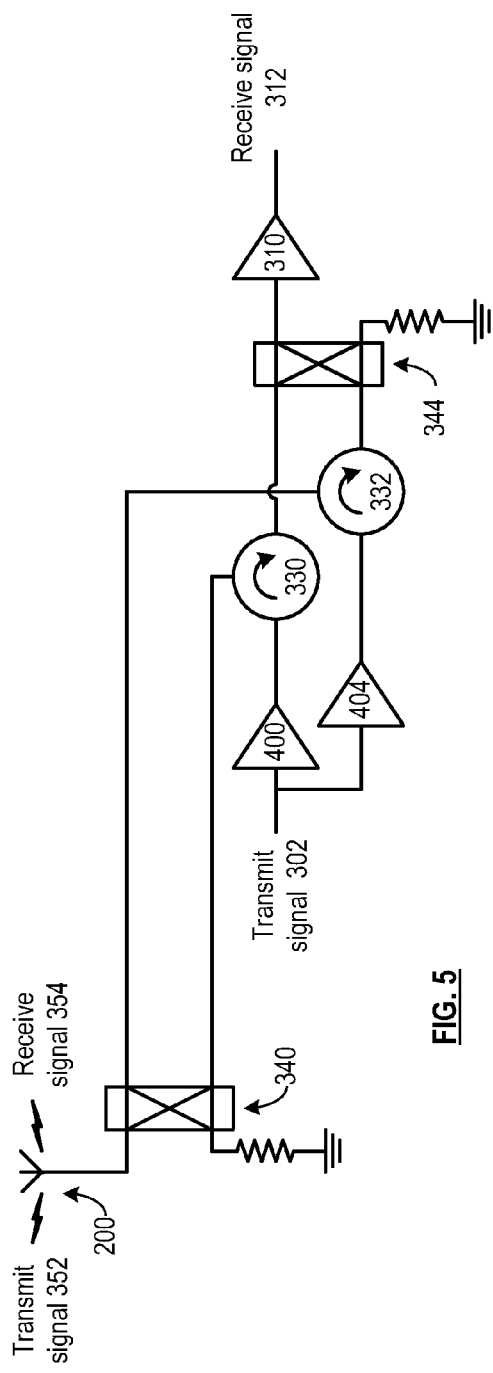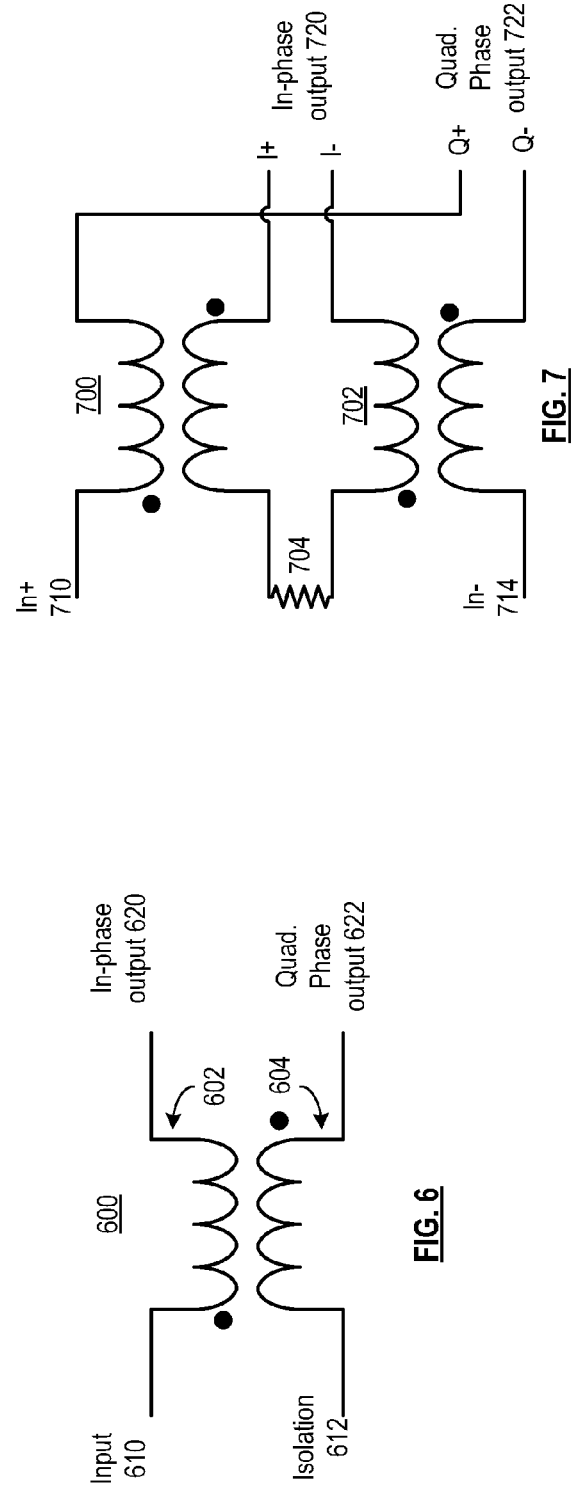

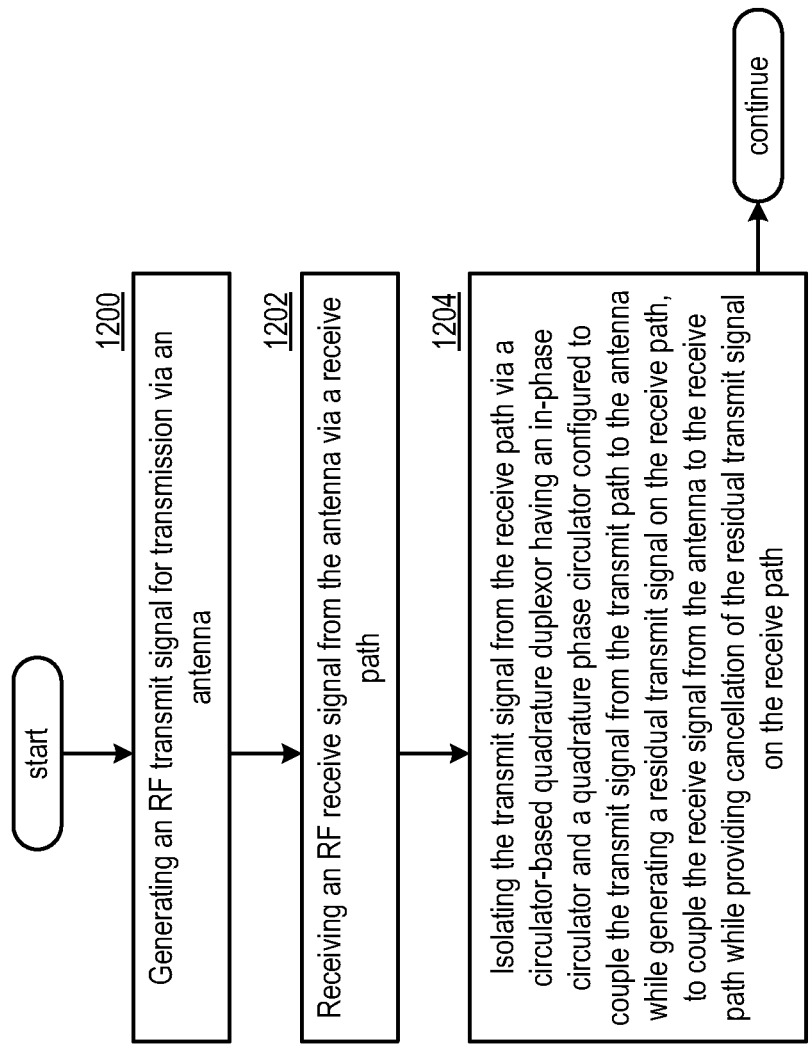

WIRELESS TRANSCEIVER WITH CIRCULATOR-BASED QUADRATURE DUPLEXER AND METHODS FOR USE THEREWITH

CROSS-REFERENCE TO RELATED APPLICATIONS

The present U.S. Utility patent application claims priority pursuant to 35 U.S.C. §119(e) to the following U.S. Provisional Patent Applications:

U.S. Provisional Application No. 61/881,271, entitled "HIGH ISOLATION RADIO FRONT END AND APPLICATIONS THEREOF", filed Sep. 23, 2013; and U.S. Provisional Application No. 61/909,816, entitled "WIRELESS TRANSCEIVER WITH CIRCULATOR-BASED QUADRATURE DUPLEXER AND METHODS FOR USE THEREWITH", filed Nov. 27, 2013.

all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND

1. Technical Field

This disclosure relates generally to wireless communication systems and to wireless communication devices that operate therewith.

2. Description of Related Art

In many wireless communication systems, wireless communications occur in a full duplex manner (e.g., transmit and receive on the same frequency) or a near full duplex manner (e.g., transmit and receive on different, but very close, frequencies). In addition, many of the systems utilize multiple frequency bands to support the wireless communications. As such, a wireless communication device operating in a full, or near full, duplex mode may use multiple frequency bands within a system.

A wireless communication device operating in full, or near full, duplex mode may have the transmitted signal leak (i.e., TX bleed-through) into the receive circuitry of the device via the circuitry within the wireless communication device, which adversely effects processing received signals. One solution to reduce TX bleed-through is to use very narrow band TX filters and duplexers. While this does reduce TX bleed-through, it does so at the cost of multiple TX filters and duplexers (e.g., one set per frequency of use). Further, the power amplifiers in the transmit circuitry of the wireless communication device should be narrow band and linear.

In addition, a wireless communication device operating in full, or near full, duplex mode may have the transmitted signal reflected into the receive circuitry via conditions outside of the wireless communication device, which also adversely effects processing received signals. For example, in a multiple antenna device (e.g., MIMO), cross coupling between the antennas occurs, which reflects the transmitted signal into the receive circuitry. Similar solutions for reducing the TX bleed-through can be used to reduce the adverse effects of TX reflection.

BRIEF DESCRIPTION OF THE SEVERAL VIEWS OF THE DRAWING(S)

FIG. 2 is a schematic block diagram of an embodiment of a wireless transceiver in accordance with the present disclosure;

FIG. 3 is a schematic block diagram of an embodiment of a radio front end in accordance with the present disclosure;

FIG. 4 is a schematic block diagram of another embodiment of a radio front end in accordance with the present disclosure;

FIG. 5 is a schematic block diagram of another embodiment of a radio front end in accordance with the present disclosure;

FIG. 6 is a schematic block diagram of an embodiment of a quadrature hybrid in accordance with the present disclosure;

FIG. 7 is a schematic block diagram of another embodiment of a quadrature hybrid in accordance with the present disclosure;

Figure 10:
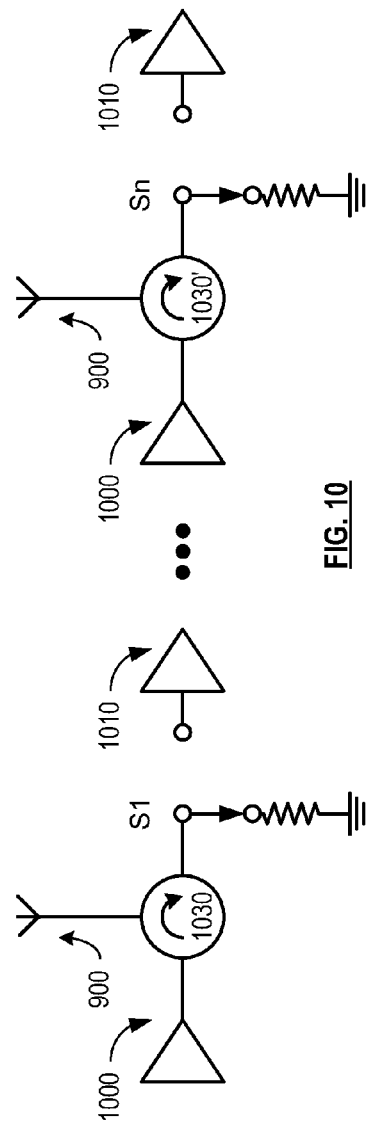
Figure 11:
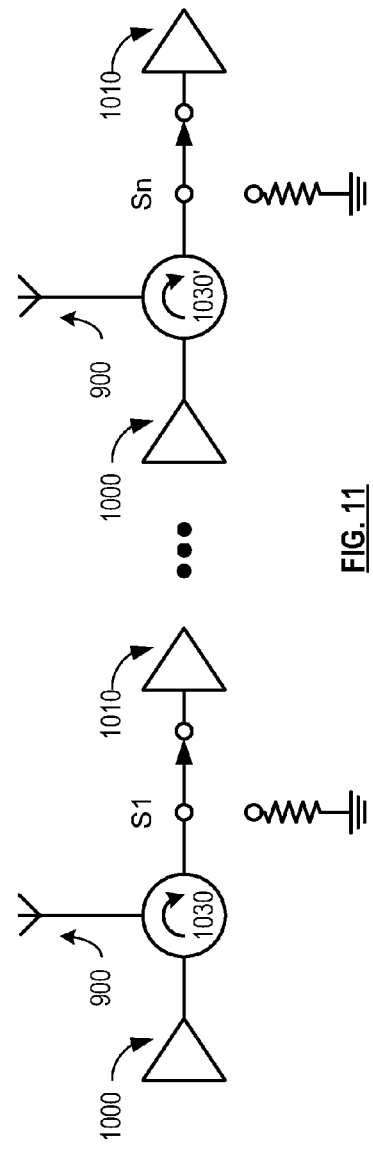

FIGS. 10 and 11 present a schematic block diagram of another embodiment of a radio front end in accordance with the present disclosure; and FIG. 12 is a flow diagram of another embodiment of a method in accordance with the present disclosure.

DETAILED DESCRIPTION

Figure 1:
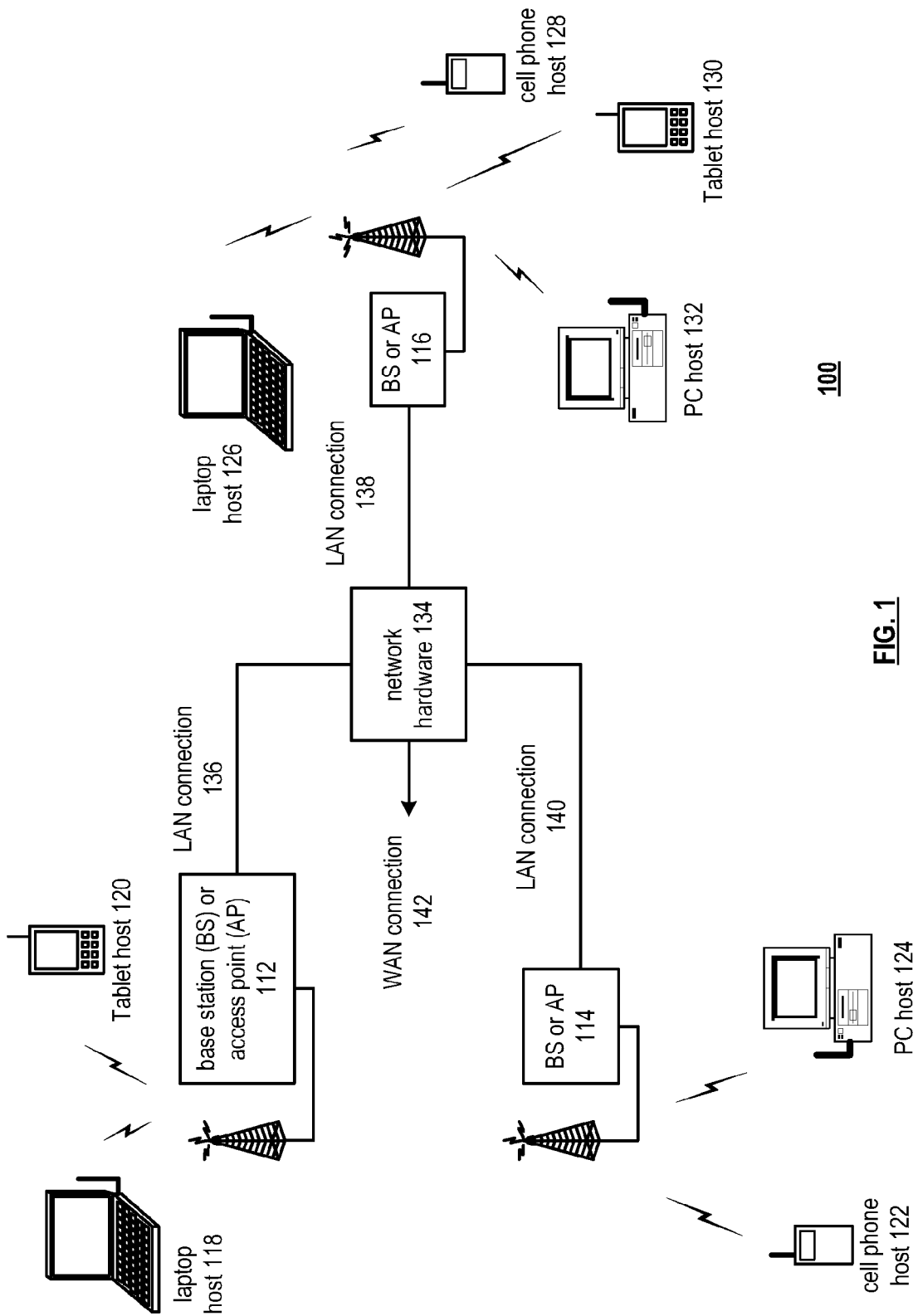
FIG. 1 is a schematic block diagram of an embodiment of a wireless communication system in accordance with the present disclosure.

FIG. 1 is a schematic block diagram of a wireless communication system in accordance with various embodiments. A communication system 100 includes a plurality of base stations and/or access points 112, 114 and 116, a plurality of wireless communication devices 118, 120, 122, 124, 126, 128, 130 and 132 and a network hardware component 134. The wireless communication devices 118, 120, 122, 124, 126, 128, 130 and 132 may be laptop host computers 118 and 126, tablet hosts 120 and 130, personal computer hosts 124 and 132, cellular telephone hosts 122 and 128 and/or other wireless devices.

The base stations or access points 112, 114 and 116 are operably coupled to the network hardware 134 via local area network connections 136, 138 and 140. The network hardware 134, which may be a router, switch, bridge, modem, system controller, etcetera, provides a wide area network connection 142 for the communication system 100. Each of the base stations or access points 112, 114 and 116 has an associated antenna or antenna array to communicate with the wireless communication devices in its area. Typically, the wireless communication devices register with a particular base station or access point 112, 114 or 116 to receive services from the communication system 100. For direct connections (i.e., point-to-point communications), wireless communication devices communicate directly via an allocated channel.

Typically, base stations are used for cellular telephone systems and like-type systems, while access points are used for in-home or in-building wireless local area networks. Regardless of the particular type of communication system, each wireless communication device includes a built-in transceiver and/or is coupled to a transceiver.

In an embodiment, one or more of the communication devices 118, 120, 122, 124, 126, 128, 130 and 132 operates more than one wireless network. For example, the base stations or access points 112, 114 and 116 could operate in accordance with a wireless local area network protocol such as an 802.11 protocol and one or more wireless communication devices 118, 120, 122, 124, 126, 128, 130 and 132 can be capable of cellular voice and data communications via a protocol such as Enhanced Data rates for GSM Evolution (EDGE), General Packet Radio Service (GPRS), high-speed downlink packet access (HSDPA), high-speed uplink packet access (HSUPA and/or variations thereof) 3GPP (third generation partnership project), LTE (long term evolution), UMTS (Universal Mobile Telecommunications System).

One or more of the wireless communication devices described herein includes a wireless transceiver having circulator-based duplexer, such as a circulator-based quadrature duplexer or other duplexer that includes one or more functions and features described in conjunction with FIGS. 2-12.

FIG. 2 is a schematic block diagram of an embodiment of a wireless transceiver in accordance with the present disclosure. In particular, a wireless transceiver is presented for use in any of the base stations or access points 112, 114 and 116 or the wireless communication devices 118, 120, 122, 124, 126, 128, 130 and 132. The wireless transceiver includes an antenna 200, a transmit path 205, a circulator-based quadrature duplexer 210, a receive path 215 and a baseband section 220.

The transmit path 205 is configured to receive a baseband signal or near baseband signal that includes outbound data from the baseband section 220 and to generate a radio frequency (RF) transmit signal that includes the outbound data for transmission via antenna 200.

In an example of operation, the baseband section 220 (e.g., one or more processors) performs one or more functions to transmit outbound data (e.g., voice, text, audio, video, graphics, etc.). The baseband section 220 converts the outbound data into one or more outbound symbol streams in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. Note that the baseband section 220 converts the outbound data into a single outbound symbol stream for Single Input Single Output (SISO) communications and/or for Multiple Input Single Output (MISO) communications and converts the outbound data into multiple outbound symbol streams for Single Input Multiple Output (SIMO) and Multiple Input Multiple Output (MIMO) communications.

The baseband section 220 provides the outbound symbol stream(s) to the up conversion circuit of the transmit path 205, which converts the outbound symbol stream(s) into one or more up converted signals (e.g., signals in one or more frequency bands 800 MHz, 1800 MHz, 1900 MHz, 2000 MHz, 2.4 GHz, 5 GHz, 60 GHz, etc.). The up conversion circuit may have a direct conversion topology or a super-heterodyne topology and may include discrete digital components and/or analog circuitry. In addition, the up conversion circuit may receive and process the outbound symbol stream(s) as Cartesian coordinates, as polar coordinates, and/or as hybrid polar-Cartesian coordinates.

A transmit (TX) output circuit of the transmit path 205 receives the one or more up converted signals and provides them to one or more of the power amplifiers (PAs). The transmit output circuit may include a splitter for providing an up converted signal to multiple power amplifiers such that, when the signals are transmitted, they are combined in air, which increases the transmit power. In this manner, one or more of the expensive discrete components (e.g., surface acoustic wave (SAW) filters, off-chip power amplifiers, duplexers, inductors, and/or capacitors) may be omitted.

In addition, or in the alternative, the transmit output circuit may include one or more phase shift circuits to phase shift the one or more up converted signals to facilitate beamforming. The transmit output circuit may further include, or include in the alternative, a polar coordinate driver to facilitate polar coordinate outbound signals.

Regardless of the specific implementation of the transmit output circuit, one or more power amplifiers receives the up-converted signal(s) and amplifies them to produce outbound signal(s).

The receive path 215 is configured to receive an RF receive signal that includes inbound data via the antenna 200 and to demodulate the RF receive signal for extraction of the inbound data via baseband section 220.

The circulator-based quadrature duplexer 210 includes an in-phase circulator and a quadrature-phase circulator configured to couple the transmit signal from the transmit path 205 to the antenna 200 while generating a residual transmit signal on the receive path 215, and to couple the receive signal from the antenna 200 to the receive path 215. In particular, the circulator-based quadrature duplexer 210 provides and/or otherwise promotes cancellation or cancels substantially all of the residual transmit signal on the receive path 215.

In an example of duplex operation, the antenna 200 receives one or more inbound signals and provides them to the circulator-based quadrature duplexer 210. The circulator-based quadrature duplexer 210 provides the inbound signal(s) to one or more of the low noise amplifiers of the receive path 215, which amplify the inbound signal(s) to produce amplified inbound signal(s). The low noise amplifier(s) provide the amplified inbound signal(s) to a receive (RX) input circuit of the receive path 215, which is a complimentary circuit to the transmit output circuit. For instance, if the transmit output circuit includes a splitter, the receive input circuit includes a combiner.

The receive input circuit provides the inbound signal to a down conversion circuit of the receive path 215, which converts the inbound signal into one or more inbound symbol streams. The down conversion circuit may have a direct conversion topology or a super-heterodyne topology and may include discrete digital components and/or analog circuitry. In addition, the down conversion circuit may receive and process the inbound signals as Cartesian coordinates, as polar coordinates, and/or as hybrid polar-Cartesian coordinates.

The baseband section 220 converts the inbound symbol stream(s) into inbound data (e.g., voice, text, audio, video, graphics, etc.) in accordance with one or more wireless communication standards. Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling. Note that the baseband section 220 converts a single inbound symbol stream into the inbound data for Single Input Single Output (SISO) communications and/or for Multiple Input Single Output (MISO) communications and converts multiple inbound symbol streams into the inbound data for Single Input Multiple Output (SIMO) and Multiple Input Multiple Output (MIMO) communications.

FIG. 3 is a schematic block diagram of an embodiment of a radio front end in accordance with the present disclosure. In particular, radio front end is presented that includes a power amplifier 300 of transmit path 205 that amplifies a transmit signal 302, a low noise amplifier 310 of receive path 215 that generates a receive signal 312, and antenna 200 for transmitting a transmit signal 352 and receiving a receive signal 354 and a circulator-based quadrature duplexer 210 that includes in-phase (I) circulator 330, quadrature-phase (Q) circulator 332, quadrature hybrids 340, 342, and 344, each having a load implemented as an isolation resistor as shown.

The quadrature hybrid 340 is configured to couple the transmit signal 352 from the in-phase circulator 330 and the quadrature-phase circulator 332 to the antenna 200, and to couple the receive signal 354 from the antenna 200 to the in-phase circulator 330 and the quadrature-phase circulator 332. The quadrature hybrid 342 is configured to couple the transmit signal 302 from the transmit path 205 to the in-phase circulator 330 and the quadrature-phase circulator 332. The quadrature hybrid 344 is configured to couple the receive signal from the in-phase circulator 330 and the quadrature-phase circulator 332 to the receive path 215 and to cancel the residual transmit signal on the receive path 215 via the superposition or other combining of the residual transmit signal with another signal of equal or substantially equal amplitude and opposite or substantially opposite phase or via other cancellation.

The in-phase and quadrature-phase circulators 330 and 332 can include a ferrite circulator that functions as a duplexer and provides a transmit/receive isolation of about 20 dB. The remaining components of the circulator-based quadrature duplexer 210, can increase the transmit/receive isolation to 50 dB or more for high power transmit applications—i.e. to cancel substantially all of any residual transmit signals introduced on the receive path 215.

In this embodiment, the quadrature hybrids provide 90 degree phase shifts. For reception, the quadrature hybrid 340 processes the receive signal 354 into an I inbound signal that is input to the I circulator 330 and a Q inbound signal that is input to the Q circulator 332. The I and Q circulators 330 and 332 couple the I and Q inbound signals to the quadrature hybrid 344 which constructively combines these signals at the input of the low noise amplifier 310.

For transmission, the quadrature hybrid 342 processes the transmit signal 302 into an I outbound signal that is input to the I circulator 330 and a Q outbound signal that is input to the Q circulator 332. The I and Q circulators 330 and 332 couple the I and Q outbound signals to the quadrature hybrid 340 which constructively combines these signals as transmit signal 352 at the antenna 200. As previously discussed, the circulator-based quadrature duplexer 210 promotes cancellation of residual transmit signal on the receive path 215. In particular, all or substantially all of the residual transmit signals generated by the I and Q circulators 330 and 332 are cancelled by the quadrature hybrid 344 at the input of the low noise amplifier 310. As such, TX leakage is substantially reduced.

Consider the transmit signal 302 to be represented by I outbound signal to be presented by T(0) and the Q outbound signal to be presented by T(90) and the I and Q residual transmit signals to be represented by t(0) and t(90) where:

$$t(0)=\alpha T(0)$$

$$t(90)=\alpha T(90)$$

where α represents the leakage of I and Q circulators 330 and 332. These I and Q residual transmit signals are combined destructively by the quadrature hybrid 344 to cancel at the input of low noise amplifier 310. In particular, the quadrature hybrid 344 shifts the phase of the Q signal by an additional 90 degrees to generate a signal at the input of low noise amplifier 310 as the sum of t(0) and t(180). Note that:

$$t(0)=-t(180)$$

therefore, the residual transmit signals are cancelled on the transmit path 215 at the input of the low noise amplifier 310. In this fashion, the circulator-based quadrature duplexer 210 promotes cancellation of the residual transmit signals on the receive path 215 via phase cancellation.

The I and Q circulators 330 and 332 couple the I and Q outbound signals to the quadrature hybrid 340 as:

$$I\,\text{signal}=(1-\alpha)T(0)$$

$$Q\,\text{signal}=(1-\alpha)T(90)$$

These I and Q signals are combined constructively by the quadrature hybrid 340 to generate a transmit signal 352. In particular, the quadrature hybrid 340 shifts the phase of the I signal by 90 degrees to generate the transmit signal 352 as 2(1−α)T(90).

It should be noted FIG. 3 presents only one possible embodiment of a circulator-based quadrature duplexer 210. Further embodiments are presented in conjunction with FIGS. 4-5 that follow.

FIG. 4 is a schematic block diagram of another embodiment of a radio front end in accordance with the present disclosure. In particular, radio front end is presented that operates in a similar fashion to the embodiment of FIG. 3 that includes many similar elements that are referred to by common reference numerals.

In this embodiment, the circulator-based quadrature duplexer includes only a single quadrature hybrid 340. The in-phase power amplifier (I-PA) 400 and quadrature-phase power amplifier (Q-PA) 404 generate the I and Q outbound signals to I and Q circulators 330 and 332. Further, in-phase lower noise amplifier (I-LNA) 410 and quadrature-phase low noise amplifier (Q-LNA) 414 generate an I/Q receive signal 412. The 90 degree phase shifts provided by both the Q-PA 404 and Q-LNA 414 result in a 180 degree phase shift for the residual transmit signals between I and Q components. This provides cancellation of the residual transmit signals after the output of the I-LNA 410 and Q-LNA 414 along the receive path 215.

FIG. 5 is a schematic block diagram of another embodiment of a radio front end in accordance with the present disclosure. In particular, radio front end is presented that operates in a similar fashion to the embodiments of FIGS. 3-4 that includes many similar elements that are referred to by common reference numerals.

In this embodiment, circulator-based quadrature duplexer 210 includes two quadrature hybrids 340 and 344. The in-phase power amplifier (I-PA) 400 and quadrature-phase power amplifier (Q-PA) 404 generate the I and Q outbound signals to I and Q circulators 330 and 332. Like the embodiment of FIG. 3, the I and Q residual transmit signals are combined destructively by the quadrature hybrid 344 to cancel at the input of low noise amplifier 310.

FIG. 6 is a schematic block diagram of an embodiment of a quadrature hybrid in accordance with the present disclosure. A quadrature hybrid, such as quadrature hybrid 340, 342 or 344 is shown as implemented via a balun. In this embodiment, a single-ended 90° hybrid circuit includes a transformer 600 having a first winding 602 and a second winding 604 with winding polarities as shown. The 90° hybrid circuit has two inputs, IN 610 and ISO 612 and two outputs, in-phase output 620 and quadrature-phase output 622. When a signal is inputted to the IN port 610 and the ISO port 612 is properly terminated (which can be done in variety of ways—such as via a resistor, as shown, or other load), the 90° hybrid circuit outputs I and Q signals 620 and 622 of the inputted signal (e.g., a zero degree phase shifted representation of the signal and a ninety degree phase shifted representation of the signal).

FIG. 7 is a schematic block diagram of another embodiment of a quadrature hybrid in accordance with the present disclosure. A quadrature hybrid, such as quadrature hybrid 340, 342 or 344 is shown that operates via differential signaling. The differential 90° hybrid circuit includes two transformers 700 and 702 and a resistor 704. The 90° hybrid circuit has two differential inputs IN+ 710 and IN− 714 and two differential outputs, in-phase output 720 and quadrature-phase output 722. A resistor 704 is coupled between the ISO differential inputs. Each of the transformers 700 and 702 includes two windings with the polarity as shown.

Figure 8:
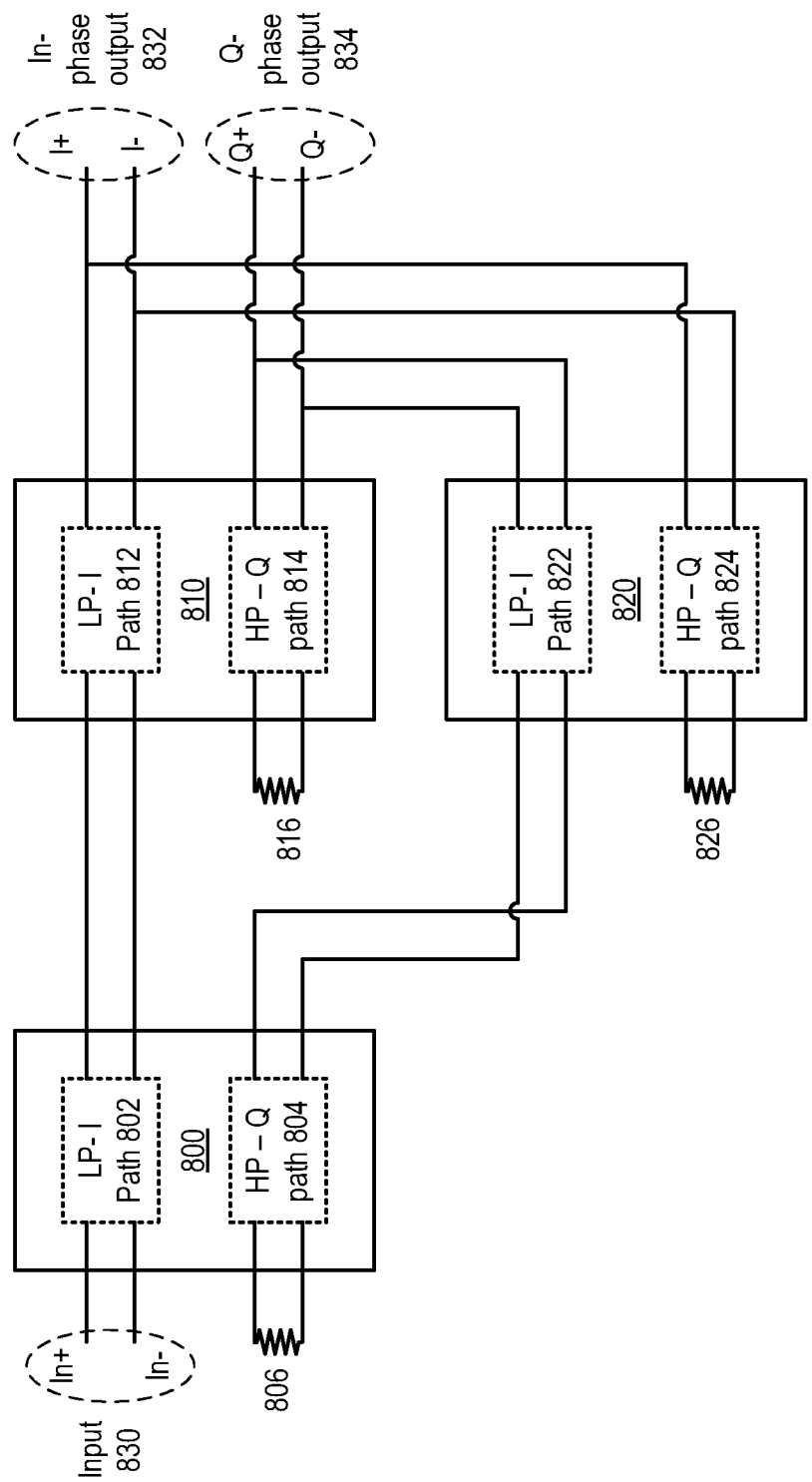
FIG. 8 is a schematic block diagram of another embodiment of a quadrature hybrid in accordance with the present disclosure.

FIG. 8 is a schematic block diagram of another embodiment of a quadrature hybrid in accordance with the present disclosure. A quadrature hybrid, such as quadrature hybrid 340, 342 or 344 is shown that includes a plurality of low-pass filters and a plurality of high-pass filters. In this embodiment, three 90° hybrid circuits 800, 810 and 820 and three resistors 806, 816 and 826 are configured as shown to provide I and Q outputs 832 and 834, from input 830 for broadband applications.

Consider a frequency band between F-low and F-high. The low-pass in-phase paths 802, 812 and 822 and the high-pass Q-phase paths 804, 814 and 824 have the same cut-off frequency. The phase differential between the high-pass and low-pass paths of each hybrid is 90 degrees. The in-phase output 832 is can be represented as the product of the two low-pass paths 802 and 812 summed with the product of two high-pass paths 804 and 824 and is therefore a flat response over the entire frequency band. The Q-phase output 834 is can be represented the product of the low-pass path 802 and high-pass path 814 summed with the product of high-pass path 804 and low-pass path 822 and is therefore also a flat response over the entire frequency band.

Figure 9:
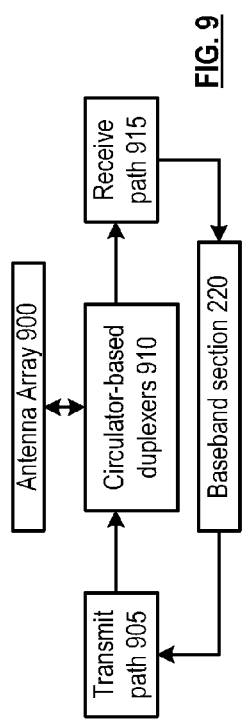
FIG. 9 is a schematic block diagram of another embodiment of a wireless transceiver in accordance with the present disclosure.

FIG. 9 is a schematic block diagram of another embodiment of a wireless transceiver in accordance with the present disclosure. In particular, a wireless transceiver is presented for use in any of the base stations or access points 112, 114 and 116 or the wireless communication devices 118, 120, 122, 124, 126, 128, 130 and 132. The wireless transceiver includes an antenna array 900, a transmit path 905, a circulator-based duplexer 910, a receive path 915 and a baseband section 220. In this embodiment, the transmit path 905 and receive path 915 includes multiple transmit paths 205 and multiple receive paths 215 as described in conjunction with FIG. 2—as part of a MIMO (multiple input multiple output) wireless transceiver that utilizes time division duplexing (TDD).

The circulator-based duplexer 910 includes a plurality of circulators and a plurality of transmit/receive switches to provide high isolation. In a transmit mode, the circulators are disconnected from the receive path 915. In the receive mode, the circulators are connected to the receive path 915.

FIGS. 10 and 11 present a schematic block diagram of another embodiment of a radio front end in accordance with the present disclosure. In particular, the radio front end of a wireless transceiver is presented as discussed in conjunction with FIG. 9. The wireless transceiver includes an antenna array 900 having multiple antenna elements, a transmit path with multiple power amplifiers 1000, a receive path with multiple low noise amplifiers 1010, and a circulator-based duplexer that includes multiple switches (S1 . . . Sn) and multiple circulators 1030.

FIG. 10 presents the transmit mode where the circulators are connected to a load resistor and disconnected, via switches (S1 . . . Sn) from the low noise amplifiers 1010. While not specifically shown, the input to the low noise amplifiers 1010 can be grounded or the low noise amplifiers 1010 can otherwise be disabled in this mode of operation to prevent undesirable signal input. FIG. 11 presents the receive mode where the circulators 1030 are connected via switches (S1 . . . Sn) to the low noise amplifiers 1010.

FIG. 12 is a flow diagram of another embodiment of a method in accordance with the present disclosure. In particular a method is presented for use with one or more functions and features described in conjunction with FIGS. 1-11. Step 1200 includes generating a radio frequency (RF) transmit signal for transmission via an antenna. Step 1202 includes receiving an RF receive signal from the antenna via a receive path. Step 1204 includes isolating the transmit signal from the receive path via a circulator-based quadrature duplexer having an in-phase circulator and a quadrature-phase circulator configured to couple the transmit signal from the transmit path to the antenna while generating a residual transmit signal on the receive path, to couple the receive signal from the antenna to the receive path while providing cancellation of the residual transmit signal on the receive path.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a Figure of any of the Figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or memory that stores operational instructions for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:
1. A wireless transceiver comprising:
a transmit path configured to generate a radio frequency (RF) transmit signal for transmission via an antenna;
a receive path configured to receive an RF receive signal via the antenna; and
a circulator-based quadrature duplexer including an in-phase circulator and a quadrature-phase circulator configured to couple the RF transmit signal from the transmit path to the antenna while generating a residual transmit signal on the receive path, and to couple the RF receive signal from the antenna to the receive path, wherein the circulator-based quadrature duplexer provides cancellation of the residual transmit signal on the receive path.

2. The wireless transceiver of claim 1 wherein the circulator-based quadrature duplexer includes a first quadrature hybrid, coupled to a first load, wherein the first quadrature hybrid is configured to couple the transmit signal from the in-phase circulator and the quadrature-phase circulator to the antenna, and to couple the RF receive signal from the antenna to the in-phase circulator and the quadrature-phase circulator.

3. The wireless transceiver of claim 2 wherein the circulator-based quadrature duplexer includes a second quadrature hybrid, coupled to a second load, the in-phase circulator and the quadrature-phase circulator, wherein the second quadrature hybrid is configured to couple the RF receive signal from the in-phase circulator and the quadrature-phase circulator to the receive path and to cancel the residual transmit signal on the receive path.

4. The wireless transceiver of claim 3 wherein the circulator-based quadrature duplexer includes a third quadrature hybrid, coupled to a third load, the in-phase circulator and the quadrature-phase circulator, wherein the third quadrature hybrid is configured to couple the transmit signal from the transmit path to the in-phase circulator and the quadrature-phase circulator.

5. The wireless transceiver of claim 2 wherein the first quadrature hybrid includes a balun.

6. The wireless transceiver of claim 2 wherein the first quadrature hybrid operates via differential signaling.

7. The wireless transceiver of claim 2 wherein the first quadrature hybrid includes broadband quadrature hybrid that includes a plurality of low-pass filters and a plurality of high-pass filters.

8. The wireless transceiver of claim 1 wherein the circulator-based quadrature duplexer provides cancellation of the residual transmit signal on the receive path via phase cancellation.

9. A wireless transceiver comprising:
a transmit path including at least one power amplifier configured to generate a radio frequency (RF) transmit signal for transmission via an antenna;
a receive path including at least one low noise amplifier configured to receive an RF receive signal via the antenna; and
a circulator-based quadrature duplexer including an in-phase circulator and a quadrature-phase circulator configured to couple the transmit signal from the transmit path to the antenna while generating a residual transmit signal on the receive path, and to couple the RF receive signal from the antenna to the receive path, wherein the circulator-based quadrature duplexer promotes phase cancellation of the residual transmit signal on the receive path.

10. The wireless transceiver of claim 9 wherein the circulator-based quadrature duplexer includes a first quadrature hybrid, coupled to a first load, wherein the first quadrature hybrid is configured to couple the transmit signal from the in-phase circulator and the quadrature-phase circulator to the antenna, and to couple the RF receive signal from the antenna to the in-phase circulator and the quadrature-phase circulator.

11. The wireless transceiver of claim 10 wherein the circulator-based quadrature duplexer includes a second quadrature hybrid, coupled to a second load, the in-phase circulator and the quadrature-phase circulator, wherein the second quadrature hybrid is configured to couple the RF receive signal from the in-phase circulator and the quadrature-phase circulator to the receive path and to cancel the residual transmit signal on the receive path.

12. The wireless transceiver of claim 11 wherein the circulator-based quadrature duplexer includes a third quadrature hybrid, coupled to a third load, the in-phase circulator and the quadrature-phase circulator, wherein the third quadrature hybrid is configured to couple the transmit signal from the transmit path to the in-phase circulator and the quadrature-phase circulator.

13. The wireless transceiver of claim 10 wherein the first quadrature hybrid includes a balun.

14. The wireless transceiver of claim 10 wherein the first quadrature hybrid operates via differential signaling.

15. The wireless transceiver of claim 10 wherein the first quadrature hybrid includes broadband quadrature hybrid that includes a plurality of low-pass filters and a plurality of high-pass filters.

16. The wireless transceiver of claim 9 wherein the at least one power amplifier includes an in-phase power amplifier and a quadrature-phase power amplifier.

17. The wireless transceiver of claim 9 wherein the at least one low noise amplifier includes an in-phase low noise amplifier and a quadrature-phase low noise amplifier.

18. The wireless transceiver of claim 9 wherein the at least one low noise amplifier includes an in-phase low noise amplifier and a quadrature-phase low noise amplifier and the phase cancellation of the residual transmit signal on the receive path occurs based on a phase differential between an output of the in-phase low noise amplifier and an output of the quadrature-phase low noise amplifier.

19. The wireless transceiver of claim 9 wherein the phase cancellation of the residual transmit signal on the receive path occurs at an input of the at least one low noise amplifier.

20. A method comprising:
generating a radio frequency (RF) transmit signal for transmission via an antenna;
receiving an RF receive signal from the antenna via a receive path; and
isolating the transmit signal from the receive path via a circulator-based quadrature duplexer having an in-phase circulator and a quadrature-phase circulator configured to couple the transmit signal to the antenna while generating a residual transmit signal on the receive path, to couple the RF receive signal from the antenna to the receive path while providing cancellation of the residual transmit signal on the receive path.

* * * * *